(12) United States Patent
Kim et al.

(10) Patent No.: US 12,135,390 B2
(45) Date of Patent: Nov. 5, 2024

(54) SYSTEM AND METHOD FOR PROCESSING RADAR SIGNAL

(71) Applicant: HYUNDAI MOBIS Co., Ltd., Seoul (KR)

(72) Inventors: Se Yoon Kim, Yongin-si (KR); Young Kyun Kong, Yongin-si (KR); Jin Soon Kim, Yongin-si (KR); Sang Hyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 581 days.

(21) Appl. No.: 17/476,977

(22) Filed: Sep. 16, 2021

(65) Prior Publication Data

US 2022/0397641 A1    Dec. 15, 2022

(30) Foreign Application Priority Data

Jun. 15, 2021    (KR) .................. 10-2021-0077457

(51) Int. Cl.
  *G01S 7/40* (2006.01)
  *G01S 13/34* (2006.01)
  *G01S 13/931* (2020.01)

(52) U.S. Cl.
  CPC ............ *G01S 7/4056* (2013.01); *G01S 13/34* (2013.01); *G01S 13/931* (2013.01)

(58) Field of Classification Search
  CPC ........ G01S 7/023; G01S 7/4056; G01S 13/34; G01S 13/931
  See application file for complete search history.

(56) References Cited

U.S. PATENT DOCUMENTS 5,150,126 A * 9/1992 Knepper ............... G01S 7/0235
  342/194
5,828,333 A * 10/1998 Richardson ........... G01S 13/325
  375/130

(Continued)

FOREIGN PATENT DOCUMENTS

| KR | 10-1295061 B1 | 8/2013 |
| KR | 10-2017-0068950 A | 6/2017 |
| KR | 10-2020-0004583 A | 1/2020 |

OTHER PUBLICATIONS

Extended European Search report dated Mar. 7, 2022, issued in corresponding European Patent Application No. 21195808.7.

(Continued)

*Primary Examiner* — Peter M Bythrow
(74) *Attorney, Agent, or Firm* — MORGAN, LEWIS & BOCKIUS LLP

(57) ABSTRACT

Provided are a system and method for processing a radar signal for deriving a Doppler frequency from a sampled digital input signal radiated by a frequency modulation continuous wave (FMCW) radar. The system includes a transmission module that repeatedly transmits a radar signal having a unique frequency variation and a pulse repetition interval, a variation module that varies the frequency variation or pulse repetition interval of the radar signal transmitted by the transmission module, an extraction module that, upon occurrence of interference between the radar signal having the varied frequency variation or pulse repetition interval and another radar signal, extracts an interference signal from the varied radar signal, and an adjustment module that adjusts the radar signal to reduce the extracted interference signal.

12 Claims, 5 Drawing Sheets

(56) References Cited

U.S. PATENT DOCUMENTS

| | | | | |
|---|---|---|---|---|
| 6,888,491 | B2* | 5/2005 | Richter | G01S 13/22 |
| | | | | 342/159 |
| 7,345,620 | B2* | 3/2008 | Voigtlaender | G01S 7/023 |
| | | | | 342/159 |
| 7,450,056 | B2* | 11/2008 | Shirakawa | G01S 7/0232 |
| | | | | 342/159 |
| 7,522,092 | B2* | 4/2009 | Okai | G01S 7/36 |
| | | | | 342/159 |
| 8,170,146 | B2* | 5/2012 | Hayem | H04B 15/06 |
| | | | | 375/316 |
| 2006/0262007 | A1* | 11/2006 | Bonthron | G01S 13/44 |
| | | | | 342/107 |
| 2008/0231496 | A1 | 9/2008 | Sakamoto | |
| 2009/0096661 | A1* | 4/2009 | Sakamoto | G01S 13/345 |
| | | | | 342/92 |
| 2010/0127915 | A1* | 5/2010 | Klotzbuecher | G01S 7/35 |
| | | | | 342/112 |
| 2011/0291875 | A1* | 12/2011 | Szajnowski | G01S 13/34 |
| | | | | 342/70 |
| 2015/0130654 | A1* | 5/2015 | Dai | G01S 13/581 |
| | | | | 342/204 |
| 2016/0124075 | A1* | 5/2016 | Vogt | G01S 13/536 |
| | | | | 342/13 |
| 2017/0219689 | A1* | 8/2017 | Hung | G01S 7/0232 |
| 2018/0113191 | A1* | 4/2018 | Villeval | G01S 7/0235 |
| 2018/0306901 | A1* | 10/2018 | Pernstål | G01S 7/0232 |
| 2020/0025866 | A1* | 1/2020 | Gulati | G01S 13/931 |
| 2020/0124699 | A1* | 4/2020 | Meissner | G01S 13/0209 |
| 2020/0379081 | A1* | 12/2020 | Meissner | G01S 13/343 |
| 2021/0215820 | A1* | 7/2021 | Ertan | G01S 7/4004 |
| 2021/0349179 | A1* | 11/2021 | Sakhnini | G01S 13/931 |
| 2022/0349986 | A1* | 11/2022 | Wu | G01S 7/354 |

OTHER PUBLICATIONS

Notice of Allowance issued in corresponding Korean Patent Application No. 10-2021-0077457 dated Jan. 4, 2024.

Office Action issued in corresponding Korean Patent Application No. 10-2021-0077457 dated Jul. 24, 2023, with English translation.

* cited by examiner

SYSTEM AND METHOD FOR PROCESSING RADAR SIGNAL

CROSS REFERENCE TO RELATED APPLICATION

The present application claims priority to Korean Patent Application No. 10-2021-0077457, filed Jun. 15, 2021, the entire contents of which is incorporated herein for all purposes by this reference.

BACKGROUND

Technical Field

The present disclosure relates to a signal processing system and method of a radar, and more particularly, to a system and method for processing a radar signal to reduce an interference signal of a vehicle-to-vehicle radar signal in a vehicle using a frequency modulation continuous wave (FMCW) radar capable of detecting a distance and a speed of an object by radiating a frequency modulation radar signal.

Description of the Related Art

A frequency modulation continuous wave (FMCW) radar may transmit a linear frequency modulation radar signal to receive the transmitted radar signal reflected from an object to be detected, and detect a distance and a speed of the object based on a frequency difference between the received signal and the transmitted signal.

Vehicles to which radars increasingly used for vehicle driving safety to provide information by recognizing a surrounding environment are applied have increased recently. Among the radars for providing information by recognizing the surrounding environment, a radar of an FMCW scheme is generally applied to a vehicle. When another vehicle and an object are detected by using the radar of the FMCW scheme, mutual interference occurs, causing non-detection where a target disappears or false detection where a wrong target is created.

The FMCW radar installed in a conventional vehicle to detect another vehicle and an object is a sensor that radiates an electromagnetic wave and recognizes the object using characteristics of a received electromagnetic wave signal, and undergoes degradation in performance thereof due to distortion of a target original signal in an interference phenomenon where a signal of another radar is introduced.

The matters described as the background art are merely for improving the understanding of the background of the present disclosure, and should not be accepted as acknowledging that they correspond to the prior art known to those of ordinary skill in the art.

SUMMARY

The present disclosure is proposed to solve these problems and aims to reduce an interference signal of a vehicle-to-vehicle radar signal to mitigate a performance degradation factor in a vehicle using an FMCW radar capable of detecting a distance and a speed of an object by radiating a frequency modulation radar signal, thereby preventing malfunction and non-operation caused by creation of a wrong target, occurring at a main instant when control over the vehicle, such as braking, steering, etc., is performed, and thus providing a normal operation.

According to an aspect of the present disclosure, there is provided a system for processing a radar signal for deriving a Doppler frequency from a sampled digital input signal radiated by a frequency modulation continuous wave (FMCW) radar, the system including a transmission module that repeatedly transmits a radar signal having a unique frequency variation and a pulse repetition interval, a variation module that varies the frequency variation or pulse repetition interval of the radar signal transmitted by the transmission module, an extraction module that, upon occurrence of interference between a varied radar signal having the varied frequency variation or pulse repetition interval and another radar signal, extracts an interference signal from the varied radar signal, and an adjustment module that adjusts the radar signal to reduce the extracted interference signal.

The variation module may continuously vary the frequency variation or the pulse repetition interval, and the extraction module may extract the interference signal when the variation module varies the radar signal.

The extraction module may calculate a cumulative histogram for a sampled digital input signal and extract the interference signal from the calculated cumulative histogram.

The cumulative histogram may be calculated by taking an absolute value of the sampled digital input signal, accumulating the absolute value, and then generating and accumulating a profile of an entire digital input signal by comparing an accumulated square value with a reference value.

The extraction module may select a threshold from the calculated cumulative histogram, and extract the interference signal for a signal exceeding the selected threshold.

The extraction module may select the threshold by calculating a value corresponding to a particular rate in the form of a power series from the cumulative histogram where the sampled digital input signal is calculated.

The adjustment module may adjust a radar signal to reduce the interference signal by replacing the extracted interference signal with 0.

According to another aspect of the present disclosure, there is provided a method for processing a radar signal for deriving a Doppler frequency from a sampled digital input signal radiated from a frequency modulation continuous wave (FMCW) radar, the method including repeatedly transmitting, by a transmission module, a radar signal having a unique frequency variation and a pulse repetition interval, varying, by a variation module, the frequency variation or the pulse repetition interval of the radar signal transmitted from the transmission module, extracting, by an extraction module, an interference signal, upon occurrence of interference between the radar signal having the varied frequency variation or pulse repetition interval and another radar signal, and adjusting, by an adjustment module, the radar signal to reduce the extracted interference signal.

The varying, by the variation module, of the frequency variation or the pulse repetition interval of the radar signal may include continuously varying the frequency variation or the pulse repetition interval, and extracting, by the extraction module, the interference signal when the variation module varies the radar signal.

The extracting, by the extraction module, of the interference signal, upon occurrence of interference between the radar signal having the varied frequency variation or pulse repetition interval and another radar signal may include calculating a cumulative histogram for a sampled digital input signal and extracting the interference signal from the calculated cumulative histogram.

The calculating, by the extraction module, of the cumulative histogram for the sampled digital input signal and the extracting of the interference signal from the calculated cumulative histogram may include calculating the cumulative histogram by taking an absolute value of the sampled digital input signal, accumulating the absolute value, and then generating and accumulating a profile of an entire digital input signal by comparing an accumulated square value with a reference value.

The calculating, by the extraction module, of the cumulative histogram for the sampled digital input signal and extracting the interference signal from the calculated cumulative histogram may include selecting a threshold in the calculated cumulative histogram and extracting the interference signal for a signal exceeding the selected threshold.

The selecting, by the extraction module, of the threshold from the calculated cumulative histogram and the extracting of the interference signal for the signal exceeding the selected threshold may include selecting the threshold by calculating a value corresponding to a particular rate in the form of a power series from the cumulative histogram where the sampled digital input signal is calculated.

The adjusting, by the adjustment module, of the radar signal to reduce the extracted interference signal may include adjusting the radar signal to reduce the interference signal by replacing the extracted interference signal with 0.

The system and method for processing a radar signal according to the present disclosure may reduce an interference signal of a vehicle-to-vehicle radar signal to mitigate a performance degradation factor in a vehicle using an FMCW radar capable of detecting a distance and a speed of an object by radiating a frequency modulation radar signal, thereby preventing malfunction and non-operation caused by creation of a wrong target, occurring at a main instant when control over the vehicle, such as braking, steering, etc., is performed, and thus providing a normal operation.

In addition, effects obtainable in the present disclosure are not limited to the effects as described above, and other effects not described above will become apparent to those of ordinary skill in the art from the following detailed description.

DETAILED DESCRIPTION

For embodiments of the present disclosure disclosed in the present specification or application, specific structural or functional descriptions are only exemplified for the purpose of describing the embodiments of the present disclosure, and the embodiments of the present disclosure may be implemented in various forms, and should not be construed as being limited to the embodiments described in the present specification or application. Hereinafter, an embodiment of the present disclosure will be described in detail with reference to the attached drawings.

Figure 1:
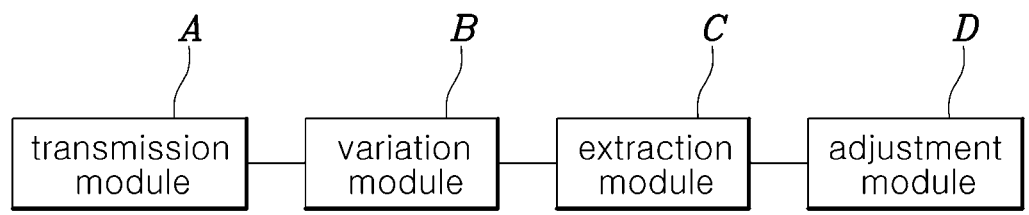
FIG. 1 illustrates a system for processing a radar signal, according to an embodiment of the present disclosure.
Figure 2:
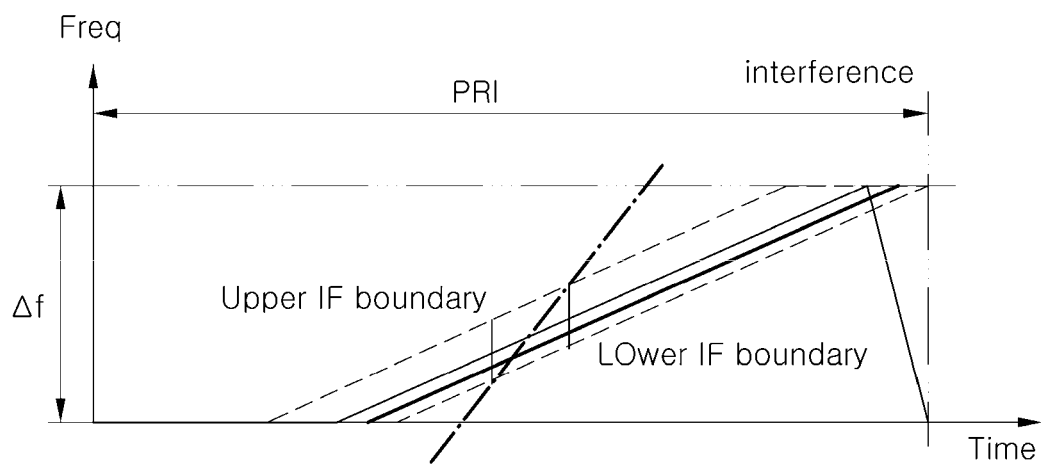
FIG. 2 is a graph showing interference when frequency variations of two radar signals are different from each other and when the frequency variations of the radar signals are the same as each other.
Figure 2:
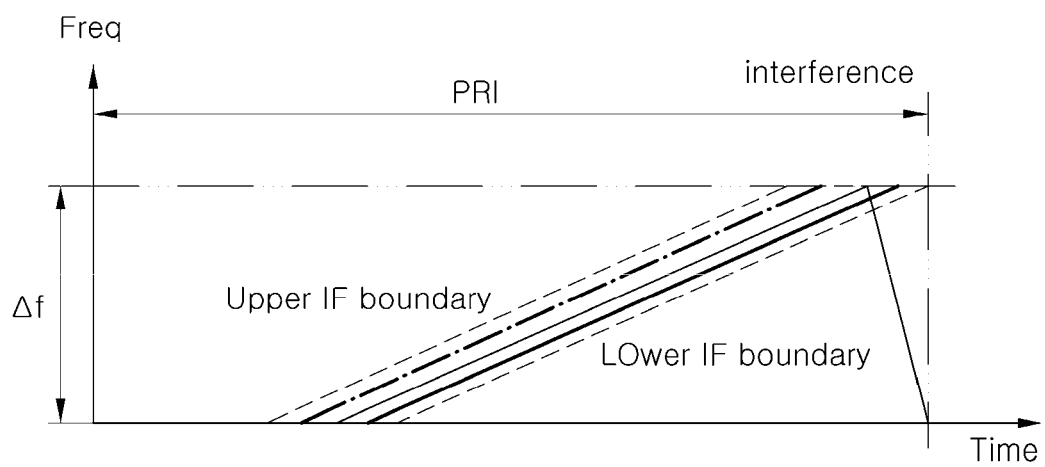
Figure 3:
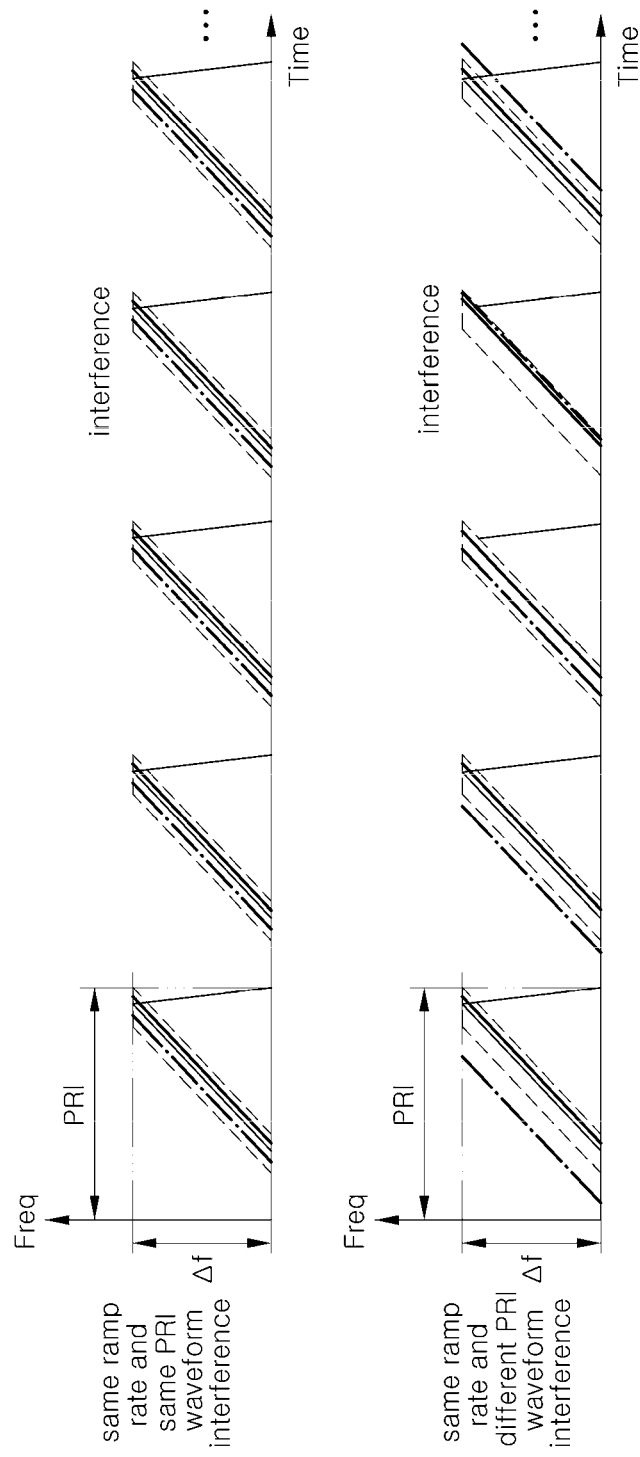
FIG. 3 is a graph showing interference corresponding to a pulse repetition interval when frequency variations of two radar signals are the same as each other.
Figure 4:
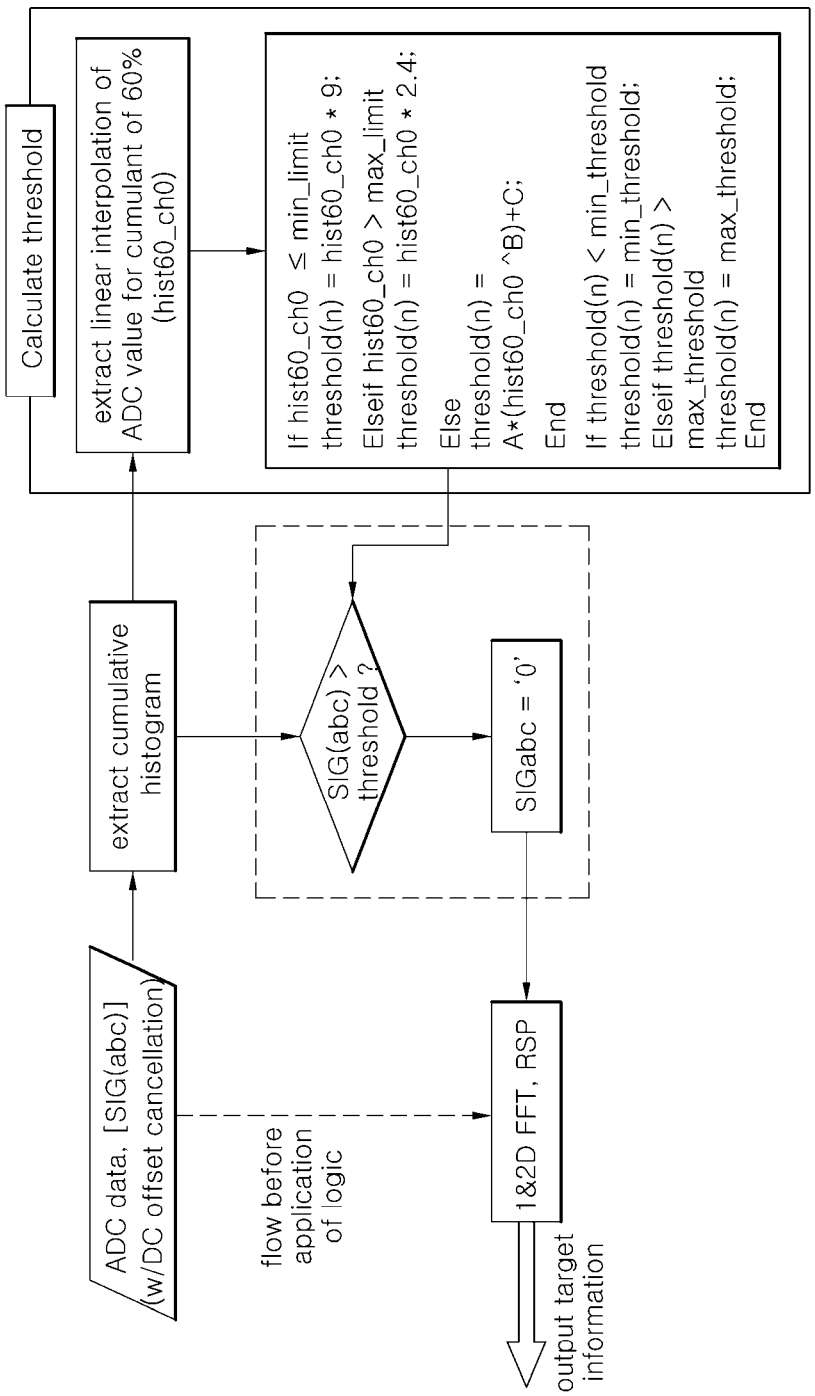
FIG. 4 is a flowchart showing adjustment of a radar signal to reduce an interference signal, extracted from a cumulative histogram, from a sampled digital input signal in the present disclosure.
Figure 5:
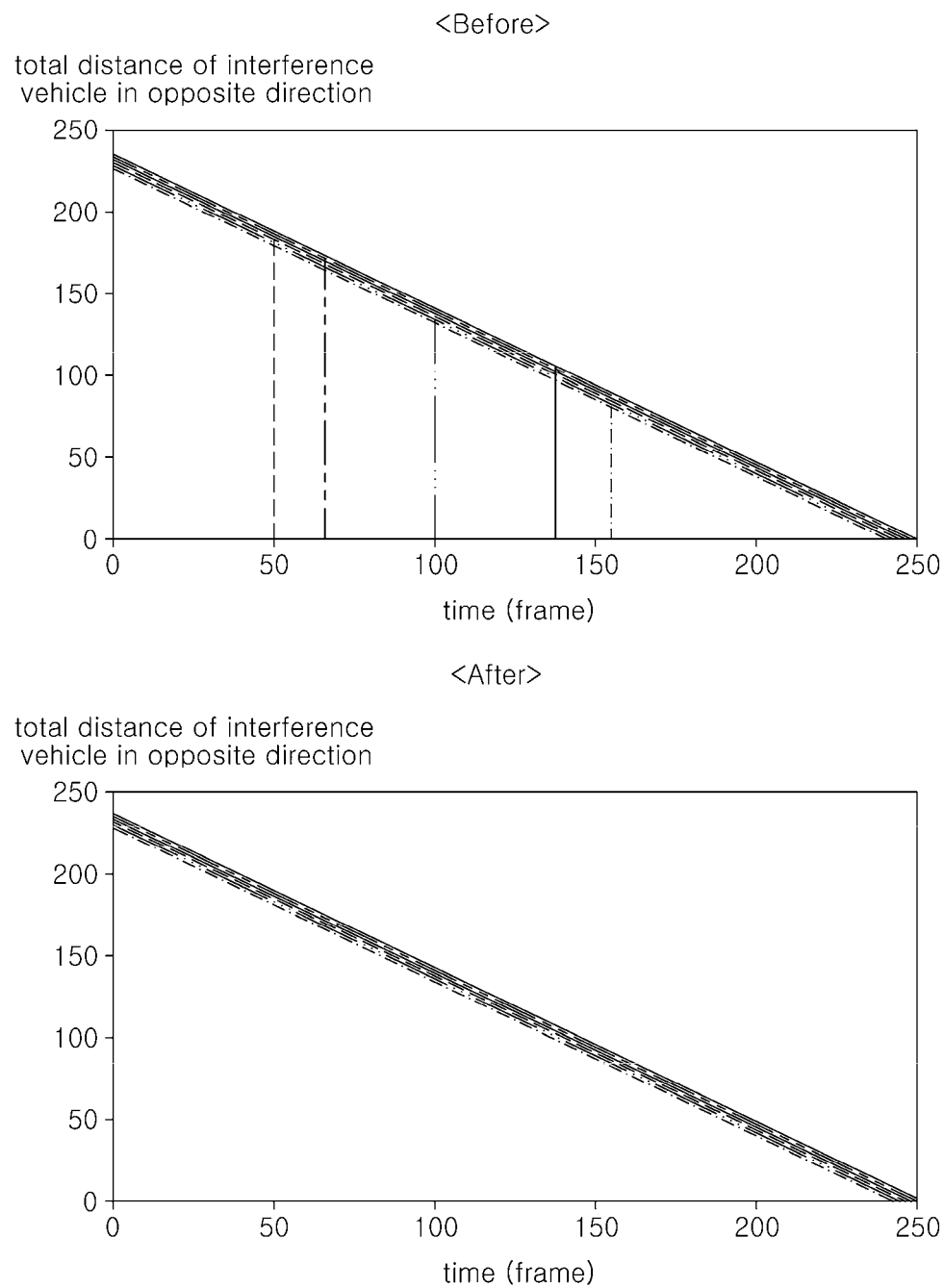
FIG. 5 is a graph showing disappearance of a target loss caused by malfunction and non-operation due to creation of a wrong target.

FIG. 1 illustrates a system for processing a radar signal, according to an embodiment of the present disclosure. FIG. 2 is a graph showing interference when frequency variations of two radar signals are different from each other and when the frequency variations of the radar signals are the same as each other. FIG. 3 is a graph showing interference corresponding to a pulse repetition interval when frequency variations of two radar signals are the same as each other. FIG. 4 is a flowchart showing adjustment of a radar signal to reduce an interference signal, extracted from a cumulative histogram, from a sampled digital input signal in the present disclosure. FIG. 5 is a graph showing disappearance of a target loss caused by malfunction and non-operation due to creation of a wrong target.

FIG. 1 illustrates a system for processing a radar signal, according to an embodiment of the present disclosure. Referring to FIG. 1, a system for processing a radar signal for deriving a Doppler frequency from a sampled digital input signal radiated by a frequency modulation continuous wave (FMCW) radar may include a processor and an associated non-transitory memory storing software instructions which, when executed by the processor, provides the functionalities of a transmission module that repeatedly transmits a radar signal having a unique frequency variation and a pulse repetition interval, a variation module that varies the frequency variation or pulse repetition interval of the radar signal transmitted by the transmission module, an extraction module that, upon occurrence of interference between the radar signal having the varied frequency variation or pulse repetition interval and another radar signal, extracts an interference signal from the varied radar signal, and an adjustment module that adjusts the radar signal to reduce the extracted interference signal. The processor may take the form of one or more processor(s) and associated memory storing program instructions.

The present disclosure reduces an interference signal of a vehicle-to-vehicle radar signal to mitigate a performance degradation factor in a vehicle using an FMCW radar capable of detecting a distance and a speed of an object by radiating a frequency modulation radar signal, thereby preventing malfunction and non-operation caused by creation of a wrong target, occurring at a main instant when control over the vehicle, such as braking, steering, etc., is performed, and thus providing a normal operation. To this end, upon occurrence of interference between the radar signal having the varied frequency variation or pulse repetition interval and another radar signal, the interference signal may be extracted from the varied radar signal and the radar signal may be adjusted to reduce the extracted interference signal.

The system for processing a radar signal may generally use a FMCW radar capable of detecting a distance and a speed of an object by radiating a frequency modulation radar signal. The FMCW radar may determine a distance between an object and a radar by performing first fast Fourier transform from a sampled digital input signal input through analog-to-digital converter (ADC) data, to detect a distance and a speed of the object. A radar signal processing device of a conventional FMCW radar may determine a speed between the object and the radar by performing second fast Fourier transform on a result of first fast Fourier transform stored for each pulse period of the radar signal to derive a Doppler frequency. When the system for processing a radar signal detects another vehicle and an object by using the radar of the FMCW scheme, mutual interference occurs, causing non-detection where a target disappears or false detection where a wrong target is created. The FMCW radar installed in a conventional vehicle to detect another vehicle and an object is a sensor that radiates an electromagnetic wave and recognizes the object using characteristics of a received electromagnetic wave signal, and undergoes performance degradation thereof due to distortion of a target original signal in an interference phenomenon where a signal of another radar is introduced, such that it is necessary to prevent non-detection where a target disappears or false detection where a wrong target is created.

Therefore, the present disclosure reduces an interference signal of a vehicle-to-vehicle radar signal to mitigate a performance degradation factor, thereby preventing malfunction and non-operation caused by creation of a wrong target, occurring at a main instant when control over the vehicle, such as braking, steering, etc., is performed, and thus making a normal operation possible.

More specifically, the transmission module may repeatedly transmit a radar signal having a unique frequency variation and a pulse repetition interval. The transmission module may radiate a radar signal through an FMCW radar in a vehicle, in which the radar signal may repeatedly transmit a chirp for every FMCW radars between vehicles and a group of repeatedly transmitted chirps may be defined as one frame. The radar signal may have a unique value with a different frequency variation and a different pulse repetition interval, and a type of mutual interference between radars may be classified according to a frequency variation and a pulse repetition interval of a radar signal radiated.

The variation module may vary the frequency variation or the pulse repetition interval of the radar signal transmitted from the transmission module. Even when each radar signal has a unique value with a different frequency variation and a different pulse repetition interval, in the case of occurrence of interference in a radar signal with the same frequency variation and pulse repetition interval between vehicles, a radar blind phenomenon occurs as total interference where a target is not detected at all. Therefore, the radar blind phenomenon where a target is not detected at all may not occur as total interference only when the variation module varies the frequency variation or the pulse repetition interval of the radar signal transmitted by the transmission module. When the frequency variation or the pulse repetition interval is varied, malfunction and non-operation, rather than total interference, may occur instantaneously. In the case of instantaneous interference, a large signal compared to a normal signal comes in a time domain, such that when first-order fast Fourier transform and second-order fast Fourier transform are performed, entire noise may be increased, degrading the detection performance of the FMCW radar and even causing non-detection. Upon occurrence of interference between the radar signal having the varied frequency variation or pulse repetition interval and another radar signal, the extraction module may extract an interference signal from the varied radar signal. In the present disclosure, the frequency variation or the pulse repetition interval of the radar signal may be varied, a cumulative histogram may be calculated for a sampled digital input signal upon occurrence of corresponding instantaneous interference, and the interference signal may be extracted from the calculated cumulative histogram. The extraction module may select a threshold from the calculated cumulative histogram, define a signal exceeding the selected threshold as an interference signal, and extract the interference signal. The variation module and the extraction module may be located in substantially the same position, and may vary the frequency variation or the pulse repetition interval of the radar signal transmitted by the transmission module or extract the interference signal from the varied radar signal. The adjustment module may adjust the radar signal to reduce the extracted interference signal. The radar signal may be adjusted to reduce the interference signal by replacing the interference signal with 0, which may be achieved by forming an internal algorithm in the FMCW radar to replace a digital input signal corresponding to the interference signal with 0.

FIG. 2 is a graph showing interference when frequency variations of two radar signals are different from each other and when the frequency variations of the radar signals are the same as each other. FIG. 3 is a graph showing interference corresponding to a pulse repetition interval when frequency variations of two radar signals are the same as each other.

The variation module may continuously vary the frequency variation or the pulse repetition interval, and the extraction module may extract the interference signal when the variation module varies the radar signal.

Referring to FIG. 2, for radar signals with the same pulse repetition interval, but different frequency variations, interference may occur between the radar signals instantaneously, increasing the entire noise, but for the radar signals with the same pulse repetition interval and the same frequency variation, a radar blind phenomenon occurs as total interference in which a target is not detected at all, failing to detect the target at all. Referring to FIG. 3, for the radar signals with the same frequency variation, but different pulse repetition intervals as shown in a lower side of FIG. 3, instantaneous interference occurs only in a particular chirp, but for the radar signals with the same frequency variation and the same pulse repetition interval as shown in an upper side of FIG. 3, the radar blind phenomenon occurs as total interference where a target is not detected at all, failing to detect the target at all. As a result, to prevent total interference where a target of a radar signal with a unique frequency variation and a pulse repetition interval is not detected at all, the variation module needs to vary the frequency variation or the pulse repetition interval continuously, i.e., at random. Thus, the extraction module may extract the interference signal from the radar signal varied by the variation module.

The extraction module may calculate a cumulative histogram for a sampled digital input signal and extract the interference signal from the calculated cumulative histogram.

The histogram divides a range where measurement values exist into several sections, and the cumulative histogram accumulates all measurement values obtained up to a specific section and divides a range where the measurement values exist into several sections. The extraction module may calculate the cumulative histogram for the sampled digital input signal, and the extraction of the interference signal from the calculated cumulative histogram may be performed by first selecting a threshold to be described below and taking a signal exceeding the threshold as the interference signal.

The cumulative histogram may be calculated by taking an absolute value of the sampled digital input signal, accumulating the absolute value, and then generating and accumulating a profile of an entire digital input signal by comparing an accumulated square value with a reference value.

The cumulative histogram may be extracted for the sampled digital input signal, and the calculation of the cumulative histogram may be performed by taking an absolute value of the sampled digital input signal and then counting the number of hits between boundary values. The total number of boundary values is 64, and the boundary values have a 16th power range of 0-2, such that a histogram may be calculated by counting the number of hits between the boundary values for the sampled digital input signal. The cumulative histogram may be calculated by generating and accumulating a profile of an entire digital input signal by comparing an accumulated square value with a reference value. The extraction module may select a threshold to be described below through the cumulative histogram, thus extracting the interference signal.

FIG. 4 is a flowchart showing adjustment of a radar signal to reduce an interference signal, extracted from a cumulative histogram, from a sampled digital input signal in the present disclosure.

Referring to FIG. 4, the extraction module may select a threshold from the calculated cumulative histogram, and extract the interference signal for a signal exceeding the selected threshold.

The threshold may be selected to prevent the sampled digital input signal from diverging or converging to zero (0), and may be selected empirically through multiple test data. The extraction module may select the threshold based on a particular rate at which the frequency variation and the pulse repetition interval affect the calculated cumulative histogram, and it can be seen from FIG. 4 that the threshold is selected based on a value 60% of the cumulative histogram through multiple test data. The particular rate may be selected based on a rate at which instantaneous interference has a little influence. The related art determines a speed between an object and a radar by deriving a Doppler frequency based on first-order fast Fourier transform and second-order fast Fourier transform, instead of selecting the threshold from the cumulative histogram. However, the present disclosure selects the threshold for the sampled digital input signal after extracting the cumulative histogram from the sampled digital input signal.

The extraction module may select the threshold by calculating a value corresponding to a particular rate in the form of a power series from the cumulative histogram where the sampled digital input signal is calculated.

The power series may mean a series that may be expressed as $\Sigma a(x-a)$, and may also mean a constant series. The extraction module may define a rate at which instantaneous interference has a little influence as the particular rate to select the threshold. For the power series, a random coefficient may be added to an exponential series, in which a value may differ with a value x and a convergence or divergence state may also vary. Therefore, the cumulative histogram may be calculated by taking and accumulating an absolute value of the sampled digital input signal, and then generating and accumulating a profile of an entire digital input signal by comparing an accumulated square value with a reference value, such that the threshold may be selected through a power series for a value corresponding to the particular rate in the cumulative histogram from which the sampled digital input signal is calculated.

FIG. 5 is a graph showing disappearance of a target loss caused by malfunction and non-operation due to creation of a wrong target.

The adjustment module may adjust a radar signal to reduce the interference signal by replacing the extracted interference signal with 0.

The radar signal exceeding the threshold is determined as the interference signal, such that the adjustment module may replace the sampled digital input signal corresponding to the interference signal with 0. Although instantaneous interference occurs in the radar signal with the frequency variation or pulse repetition interval varied by the variation module, the interference may disappear when the adjustment module replaces the sampled digital input signal corresponding to the interference signal with 0. Referring to FIG. 5, an X axis indicates time, a Y axis indicates a detected distance, a point at which X is 0 may mean a point in time when a target is initially recognized, and a distance detected at this point may be an initially recognized distance. Left graphs of FIG. 5 show interference when a distance and a speed of the object from the FMCW radar are generally detected, in which a discontinuous point indicates non-detection or false detection. As can be seen from right graphs of FIG. 5, the variation module may vary the frequency variation or the pulse repetition interval, and the adjustment module may reduce the interference signal of the radar signal to reduce the interference signal by replacing the interference signal with 0 for the extracted interference signal, thereby mitigating a performance degradation factor and thus preventing malfunction and non-operation caused by creation of a wrong target, occurring at a main instant when control over the vehicle, such as braking, steering, etc., is performed, thus enabling a normal operation.

A method for processing a radar signal for deriving a Doppler frequency from a sampled digital input signal radiated from a frequency modulation continuous wave (FMCW) radar may include repeatedly transmitting, by a transmission module, a radar signal having a unique frequency variation and a pulse repetition interval, varying, by a variation module, the frequency variation or the pulse repetition interval of the radar signal transmitted from the transmission module, extracting, by an extraction module, an interference signal, upon occurrence of interference between the radar signal having the varied frequency variation or pulse repetition interval and another radar signal, and adjusting, by an adjustment module, the radar signal to reduce the extracted interference signal.

In addition, the varying, by the variation module, of the frequency variation or the pulse repetition interval of the radar signal may include continuously varying the frequency variation or the pulse repetition interval, and extracting, by the extraction module, the interference signal when the variation module varies the radar signal.

The extracting, by the extraction module, of the interference signal, upon occurrence of interference between the radar signal having the varied frequency variation or pulse repetition interval and another radar signal may include calculating a cumulative histogram for a sampled digital input signal and extracting the interference signal from the calculated cumulative histogram.

The calculating, by the extraction module, of the cumulative histogram for the sampled digital input signal and the extracting of the interference signal from the calculated cumulative histogram may include calculating the cumulative histogram by taking an absolute value of the sampled digital input signal, accumulating the absolute value, and then generating and accumulating a profile of an entire digital input signal by comparing an accumulated square value with a reference value.

The calculating, by the extraction module, of the cumulative histogram for the sampled digital input signal and extracting the interference signal from the calculated cumulative histogram may include selecting a threshold in the calculated cumulative histogram and extracting the interference signal for a signal exceeding the selected threshold.

The selecting, by the extraction module, of the threshold from the calculated cumulative histogram and the extracting of the interference signal for the signal exceeding the selected threshold may include selecting the threshold by calculating a value corresponding to a particular rate in the form of a power series from the cumulative histogram where the sampled digital input signal is calculated.

The adjusting, by the adjustment module, of the radar signal to reduce the extracted interference signal may include adjusting the radar signal to reduce the interference signal by replacing the extracted interference signal with 0.

As described above, although the present disclosure has been shown and described in relation to specific embodiments thereof, it would be obvious to those of ordinary skill in the art that the present disclosure can be variously improved and changed without departing from the spirit of the present disclosure provided by the following claims.

| DESCRIPTION OF REFERENCE NUMERALS | |
| --- | --- |
| A: transmission module | B: variation module |
| C: extraction module | D: adjustment module |

What is claimed is:

1. A system for processing a radar signal for deriving a Doppler frequency from a sampled digital input signal radiated from a frequency modulation continuous wave (FMCW) radar, the system comprising:
    a transmission module repeatedly transmitting a radar signal having a unique frequency variation and a pulse repetition interval;
    a variation module varying the frequency variation or the pulse repetition interval of the radar signal transmitted from the transmission module;
    an extraction module extracting an interference signal from the varied radar signal upon occurrence of interference between the radar signal having the varied frequency variation or pulse repetition interval and another radar signal; and
    an adjustment module adjusting the radar signal to reduce the extracted interference signal,
    wherein the adjustment module adjusts the radar signal to reduce the interference signal by replacing the extracted interference signal with 0.

2. The system of claim 1, wherein the variation module continuously varies the frequency variation or the pulse repetition interval, and the extraction module extracts the interference signal when the variation module varies the radar signal.

3. The system of claim 1, wherein the extraction module calculates a cumulative histogram for a sampled digital input signal and extracts the interference signal from the calculated cumulative histogram.

4. The system of claim 3, wherein the cumulative histogram is calculated by taking an absolute value of the sampled digital input signal, accumulating the absolute value, and then generating and accumulating a profile of an entire digital input signal by comparing an accumulated square value with a reference value.

5. The system of claim 3, wherein the extraction module selects a threshold in the calculated cumulative histogram and extracts the interference signal for a signal exceeding the selected threshold.

6. The system of claim 5, wherein the extraction module selects the threshold by calculating a value corresponding to a particular rate in the form of a power series from the cumulative histogram where the sampled digital input signal is calculated.

7. A method for processing a radar signal for deriving a Doppler frequency from a sampled digital input signal radiated from a frequency modulation continuous wave (FMCW) radar, the method comprising:
    repeatedly transmitting, by a transmission module, a radar signal having a unique frequency variation and a pulse repetition interval;
    varying, by a variation module, the frequency variation or the pulse repetition interval of the radar signal transmitted from the transmission module;
    extracting, by an extraction module, an interference signal, upon occurrence of interference between the radar signal having the varied frequency variation or pulse repetition interval and another radar signal; and
    adjusting, by an adjustment module, the radar signal to reduce the extracted interference signal,
    wherein the adjusting, by the adjustment module, of the radar signal to reduce the extracted interference signal comprises adjusting the radar signal to reduce the interference signal by replacing the extracted interference signal with 0.

8. The method of claim 7, wherein the varying, by the variation module, of the frequency variation or the pulse repetition interval of the radar signal comprises continuously varying the frequency variation or the pulse repetition interval, and extracting, by the extraction module, the interference signal when the variation module varies the radar signal.

9. The method of claim 7, wherein the extracting, by the extraction module, of the interference signal, upon occurrence of interference between the radar signal having the varied frequency variation or pulse repetition interval and another radar signal comprises calculating a cumulative histogram for a sampled digital input signal and extracting the interference signal from the calculated cumulative histogram.

10. The method of claim 9, wherein the calculating, by the extraction module, of the cumulative histogram for the sampled digital input signal and the extracting of the interference signal from the calculated cumulative histogram comprises calculating the cumulative histogram by taking an absolute value of the sampled digital input signal, accumulating the absolute value, and then generating and accumulating a profile of an entire digital input signal by comparing an accumulated square value with a reference value.

11. The method of claim 9, wherein the calculating, by the extraction module, of the cumulative histogram for the sampled digital input signal and extracting the interference signal from the calculated cumulative histogram comprises selecting a threshold in the calculated cumulative histogram and extracting the interference signal for a signal exceeding the selected threshold.

12. The method of claim 11, wherein the selecting, by the extraction module, of the threshold from the calculated cumulative histogram and the extracting of the interference signal for the signal exceeding the selected threshold comprises selecting the threshold by calculating a value corresponding to a particular rate in the form of a power series from the cumulative histogram where the sampled digital input signal is calculated.

* * * * *